US010543861B1

(12) United States Patent
Bartek et al.

(10) Patent No.: US 10,543,861 B1
(45) Date of Patent: Jan. 28, 2020

(54) VERTICAL RAIL MEASUREMENT DEVICE

(71) Applicant: Focused Technology Solutions, Inc., Rockaway, NJ (US)

(72) Inventors: Peter M. Bartek, Ledgewood, NJ (US); Corey Dash, Mount Arlington, NJ (US)

(73) Assignee: Focused Technology Solutions, Inc., Rockaway, NJ (US)

( * ) Notice: Subject to any disclaimer, the term of this patent is extended or adjusted under 35 U.S.C. 154(b) by 0 days.

(21) Appl. No.: 16/508,008

(22) Filed: Jul. 10, 2019

Related U.S. Application Data

(60) Provisional application No. 62/767,728, filed on Nov. 15, 2018.

(51) Int. Cl.
| | | |
|---|---|---|
| *B61K 9/08* | (2006.01) | |
| *B61K 9/12* | (2006.01) | |
| *G01B 5/06* | (2006.01) | |
| *B61L 23/04* | (2006.01) | |
| *G01M 5/00* | (2006.01) | |
| *B61L 27/00* | (2006.01) | |

(52) U.S. Cl.
CPC ......... *B61L 23/047* (2013.01); *G01M 5/0058* (2013.01); *B61L 27/0005* (2013.01)

(58) Field of Classification Search
CPC . B61K 9/08; B61K 9/00; G01B 11/24; G01B 11/14; G01B 21/20; G01B 11/2518; G01C 15/00; B61L 15/0072; B61L 23/047; B61L 25/026; B61L 23/041; B61L 27/0088; E01B 35/00
See application file for complete search history.

(56) References Cited

U.S. PATENT DOCUMENTS

| | | | |
|---|---|---|---|
| 5,462,244 A | 10/1995 | Van Der Hoek et al. | |
| 2017/0219335 A1 | 8/2017 | Shiraishi et al. | |

FOREIGN PATENT DOCUMENTS

| | | |
|---|---|---|
| CN | 101138983 A | 3/2008 |
| CN | 101219671 A | 7/2008 |
| CN | 203496924 U | 3/2014 |
| CN | 103448745 B | 4/2016 |
| CN | 206187034 U | 5/2017 |
| CN | 107521520 A | 12/2017 |
| EP | 3042824 A1 | 7/2016 |
| JP | 4342374 B2 | 10/2009 |
| JP | 4431061 B2 | 3/2010 |

(Continued)

OTHER PUBLICATIONS

Paul Ridden, "Award-Winning Device Harvests Energy from Railway Track Vibrations," at <https://newatlas.com/mechanical-motion-rectifier-railroad-energy-harvester/25223/> dated Nov. 29, 2012.

(Continued)

*Primary Examiner* — Brandi N Hopkins
(74) *Attorney, Agent, or Firm* — Banner & Witcoff, Ltd.

(57) ABSTRACT

The invention relates to a portable device for measuring vertical rail measurements under service to record and report excessive vertical rail movement to prevent a train from derailing. The device may be pivoting with a tilt sensor and light-weight. The device may include a microprocessor, sensors, and a display. The device may be installed on the rail. The device may sense an approaching train, automatically turn on the device, and measure the real-time vertical displacement and the maximum/minimum vertical movement of the rail while the train is operating over the rail at all speeds.

30 Claims, 8 Drawing Sheets

(56) References Cited

FOREIGN PATENT DOCUMENTS

| | | |
|---|---|---|
| JP | 5283548 B2 | 9/2013 |
| JP | 5629619 B2 | 11/2014 |
| KR | 101226280 B1 | 1/2013 |
| KR | 101504123 B1 | 3/2015 |

OTHER PUBLICATIONS

BMT Group Ltd., "Rail Monitoring," at <http://www.bmtwbm.com.au/markets/building-infrastructure-and-rail/rail-monitoring/.
Findlay Irvine Ltd, "Rail Signalling," at <http://www.finlayirvine.com/capabilities/rail/signalling.php dated Oct. 24, 2018>.
Hitoshi Tsunashima, "Railway Condition Monitoring, Present and Application for Regional Railways," Report of the Research Institute of Industrial Technology, Nihon University dated Nov. 11, 2017.

VERTICAL RAIL MEASUREMENT DEVICE

CROSS-REFERENCE TO RELATED APPLICATIONS

This application is claims priority to U.S. Provisional Patent Application No. 62/767,728, filed Nov. 15, 2018, entitled Vertical Rail Measurement Device, which is incorporated herein by reference in its entirety and made a part hereof.

FIELD OF THE INVENTION

The present invention relates to railcars and, more particularly, to a vertical rail measuring device for the railway industry.

BACKGROUND

There is no portable device that allows measurement and recording of rail vertical movement during full service of a train or locomotive. Currently, the only way to measure this distance between the tracks is measured is with a mechanical measuring device without the ability to data log, or detect approaching train, or send the data to an external device. A need exists for a portable, light-weight, electronic device that mounts easily to the web of the rail and the base on the ground and data logs the information that includes maximum/minimum vertical rail displacement.

SUMMARY

Aspects of the disclosure relate to a portable electronic device for measuring maximum/minimum vertical rail displacement measurements under service to record and report excessive vertical rail movement to prevent a train from derailing. The device may include a microprocessor, sensors, and a display. The device may be installed on the rail. The device may sense an approaching train, automatically turn on the device, and measure the real-time vertical rail displacement and the maximum/minimum vertical rail displacement while the train is operating over the rail at all speeds.

According to an embodiment, a vertical rail measurement device to measure maximum/minimum vertical displacement distance for the movement of a rail when a train is passing over the device may comprise a control box configured to mount to a web of a rail and a measurement arm that pivots and extends through a sensor and the control box to one of the ground or a track ballast. The measurement arm may measure a real-time vertical rail displacement, a maximum vertical rail displacement, and a minimum vertical rail displacement while a train is operating at all speeds. The measurement arm may use a tilt sensor within the control box and may extend and fix to the ground or track ballast. Additionally, the control box may include one or more sensors that automatically detect an approaching train and automatically turn on the vertical rail measurement device when an approaching train is in range. The control box may measure and record both the maximum and minimum vertical rail displacement to ensure the maximum and minimum vertical rail displacement does not exceed a vertical rail displacement that could derail the train. The vertical rail measurement device may weigh less than 3 pounds. Further, the control box may include a display that displays one or more of the following: the real-time vertical rail displacement, the maximum vertical rail displacement, or the minimum vertical rail displacement. The display may be customizable by programming to display other features and information. The display may be an LCD display. Additionally, the control box may include a microprocessor that includes data storage that can be programmed to record and log any data from the vertical rail measurement device. The data from the vertical rail measurement device may be transmitted from the control box to a smart device via Bluetooth. Further, the control box may include a magnetic mount on a mounting portion of the control box, wherein the magnetic mount attaches to the web of the rail. Additionally, the measurement arm may include a tilt sensor pivot point including an arm attached to a ball that rests on ground or track ballast.

According to another embodiment, a vertical rail measurement device to measure a vertical displacement distance for the movement of a rail when a train is passing over the device may comprise a control box configured to mount to a web of a rail and a measurement arm that pivots and extends from a vertical sensor and the control box to one of the ground or a track ballast. The control box may include a microprocessor that includes data storage that can be programmed to record and log any data from the vertical rail measurement device. The control box may also include a display that displays one or more of the following data: a real-time vertical rail displacement, a maximum vertical rail displacement, or a minimum vertical rail displacement. The measurement arm may measure the real-time vertical rail displacement, the maximum vertical rail displacement, and the minimum vertical rail displacement while a train is operating at all speeds. Additionally, the measurement arm may be a pivoting point with a tilt sensor within the control box and may have an arm with a ball that extends to the top of the ground or the track ballast.

In another embodiment, a vertical rail measurement device to measure a vertical displacement distance for the movement of a rail when a train is passing over the device may comprise a control box configured to mount to a web of a rail and a measurement arm that pivots and extends through a vertical sensor and the control box to one of the ground or a track ballast. The control box may include a magnetic mount that attaches to the web of the rail. The control box may also include a microprocessor that includes data storage that can be programmed to record and log any data from the vertical rail measurement device. Further, the control box may include an LCD display that displays the following data: a real-time vertical rail displacement, a maximum vertical rail displacement, and a minimum vertical rail displacement. The control box may also include one or more sensors that automatically detect an approaching train and automatically turn on the vertical rail measurement device when an approaching train is in range. The measurement arm may measure the real-time vertical rail displacement, the maximum vertical rail displacement, and the minimum vertical rail displacement while a train is operating at all speeds. The measurement arm may use a pivoting point with a tilt sensor within the control box to measure the vertical rail displacement and extend and fix to the ground or the track ballast. The measurement arm may include a pivoting tilt sensor connected to an arm with a ball on the end and is placed to the ground or the track ballast.

In yet another embodiment, a vertical rail measurement device to measure a vertical displacement distance for the movement of a rail when a train is passing over the device comprises a control box configured to mount to a web of a rail and a measurement arm that pivots and extends through a vertical tilt sensor and the control box to one of the ground or a track ballast. The control box may also include magnets to magnetically attach the control box to the web of the rail. Additionally, the control box may include a microprocessor that includes data storage that can be programmed to record and log any data from the vertical rail measurement device. The control box may include a display that displays one or more of the following data: a real-time vertical rail displacement, a maximum vertical rail displacement, or a minimum vertical rail displacement. The measurement arm may measure the real-time vertical rail displacement, the maximum vertical rail displacement, and the minimum vertical rail displacement while a train is operating at all speeds. The measurement arm may include a pivoting tilt sensor connected to an arm with a ball on the end of the arm with the ball extending to the ground or the track ballast.

These features, along with many others, are discussed in greater detail below.

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

This invention is a vertical rail measurement device 100 for the railway industry designed to be light weight and portable. The vertical rail measurement device 100 may be spring-loaded and installed between the web of the rail. In another embodiment, the vertical rail measurement device 100 may include a pivoting tilt sensor and installed between the web of the rail. The vertical rail measurement device 100 may include a full display. The vertical rail measurement device 100 may automatically detect an approaching train. The vertical rail measurement device 100 may turn on automatically when an approaching train is in range. Once the vertical rail measurement device 100 is installed on the web of the rail and the base on the ground, the vertical rail measurement device 100 senses the approaching train, automatically turns on, and measures the maximum and minimum up and down rail movement while a train is operating over the rail at all speeds. In another embodiment, the vertical rail measurement device 100 may detect a train speed and/or direction. The vertical rail measurement device 100 may measure and record the separation of the rail to ensure the vertical rail measurement device 100 does not exceed the maximum vertical distance that could derail the train. The vertical rail measurement device 100 may be light-weight and weigh under three pounds. The vertical rail measurement device 100 may be a portable device. The vertical rail measurement device 100 may include a microprocessor with multi-display.

Figure 1:
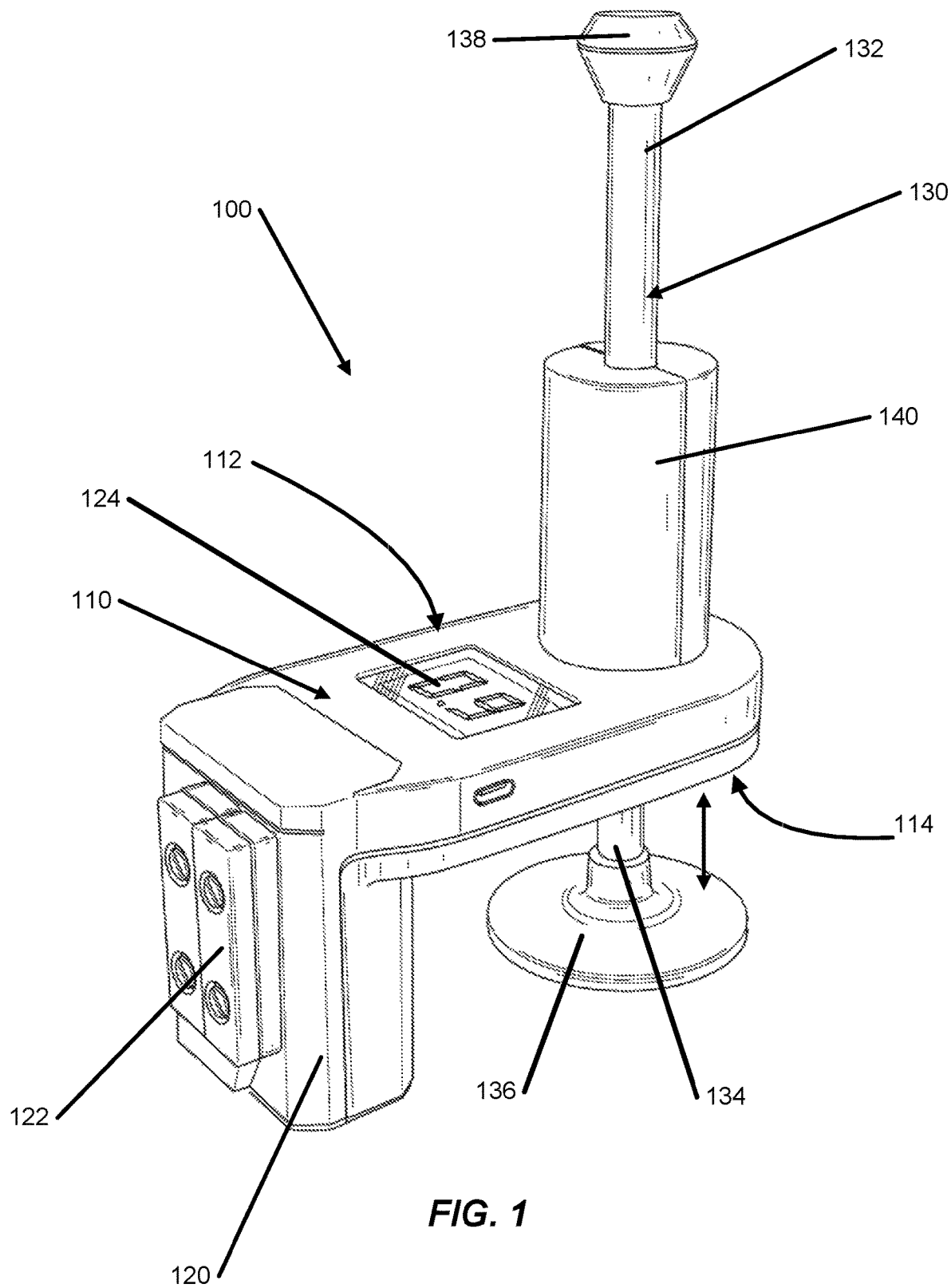
FIG. 1 is an side perspective view of a vertical rail measurement device in accordance with an embodiment of the system of the present invention.
Figure 2:
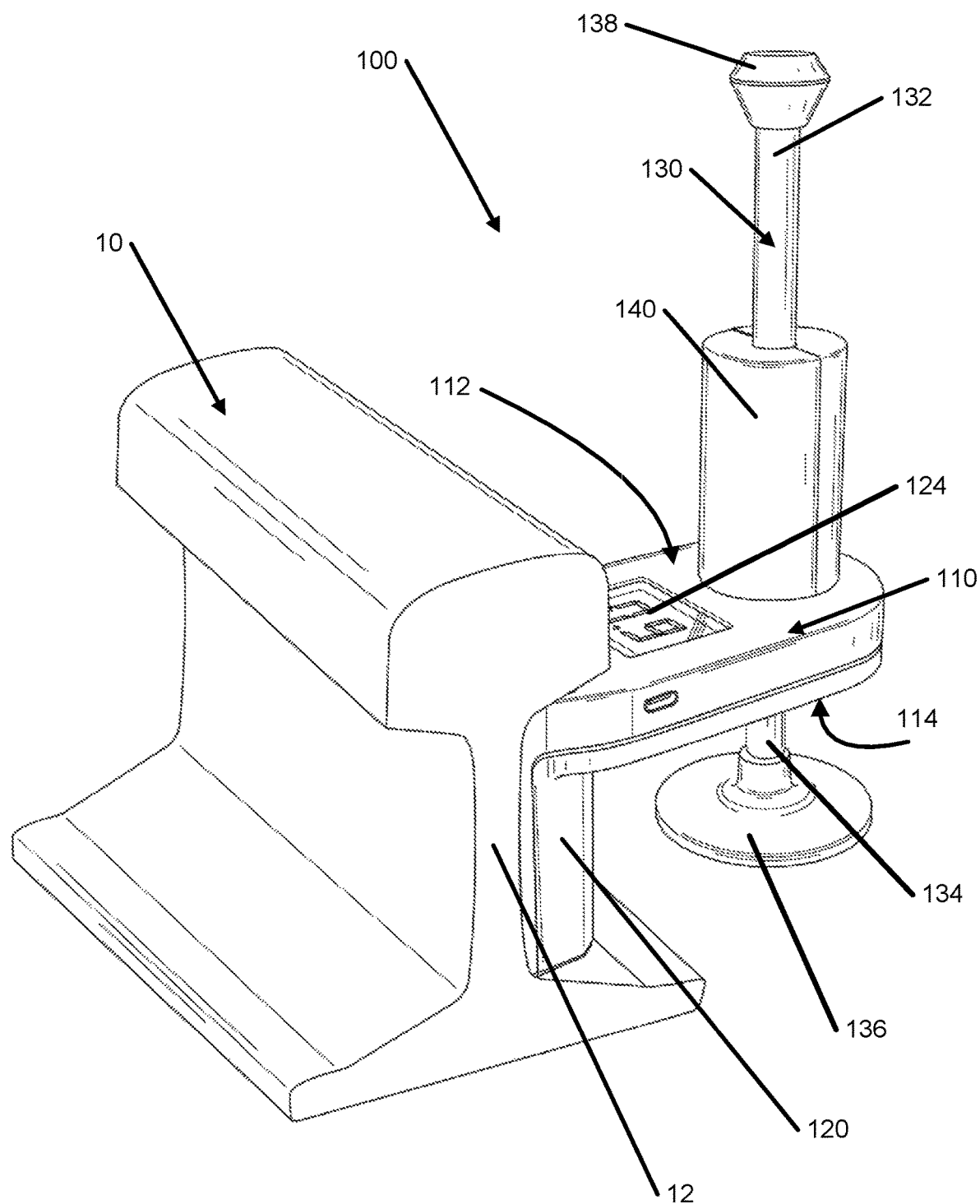
FIG. 2 is a perspective view of the vertical rail measurement device illustrated in FIG. 1 installed on a rail in accordance with an embodiment of the system of the present invention.

FIGS. 1 and 2 illustrate one embodiment of a vertical rail measurement device 100. Specifically, FIG. 1 illustrates an side perspective view of a vertical rail measurement device 100 and FIG. 2 illustrates a perspective view of the vertical rail measurement device 100 as illustrated in FIG. 1 with the vertical rail measurement device 100 installed on a rail 10. The vertical rail measurement device 100 may include a control box 110, a measurement arm 130, and a sensor 140. The measurement arm 130 may extend through the control box 110 vertically and through the sensor 140. The measurement arm 130 may be spring-loaded to slidably extend through the control box 110 and the sensor 140 in order to extend from the ground and measure the vertical displacement of a rail 10. Specifically as illustrated in FIG. 2, the vertical rail measurement device 100 may be installed on a web 12 of the rail 10 with the measurement arm 130 fixed to the track ballast on the ground.

As illustrated in FIG. 1, the measurement arm 130 includes a first end 132 and a second end 134 opposite the first end 132. The first end 132 may include a knob or ball 138 that may provide a sliding stop for the measurement arm 130 within the control box 110. The second end 134 may include a plate 136 attached to the end of the second end 134. The plate 136 may be circular in shape so that the plate 136 can be fixed to the ground, track ballast, or ground. The measurement arm 130 may be slidably attached or connected to the control box 110 and through the sensor 140. The measurement arm 130 may be spring-loaded and slidably extend through the control box 110 and the sensor 140 while fixed to the ground or track ballast or stone to measure and record the maximum and minimum vertical distance rail movement while a train is operating over the rail 10 at all speeds.

As illustrated in FIGS. 1 and 2, the control box 110 may be a rectangular shape with a top panel 112 and a bottom panel 114 opposite the top panel 112. As illustrated in FIGS. 1 and 2, the top panel 112 may include a display 124. The display 124 may be an LCD display or similar display known and used in the art. The display 124 may display various measurements, such as a real-time vertical rail displacement, and minimum and maximum vertical rail displacements. The display 124 may be customizable by software and/or programming to display other features and other information as recognized as pertinent to the operators. The control box 110 may also include one or more sensors 140. The one or more sensors 140 may sense and detect an approaching train and automatically turn on the vertical rail measurement device 100. The control box 110 may be powered by various batteries.

Generally, the vertical rail measurement device 100 and specifically, the control box 110 may attach or be mountable to one of the web 12 of the rail 10. The control box 110 may include a mounting portion 120. The mounting portion 120 may attach or be mountable to one of the web 12 of the rail 10 in various other mechanical means. For example, the mounting portion 120 of the control box 110 may attach or mount to the web 12 of the rail 10 via various magnets or magnetic arrays 122 to magnetically attach the control box 110 and the vertical rail measurement device 100 to the web 12 of the rail 10. Additionally, the mounting portion 120 and the control box 110 may utilize other mechanical coupling means, such as straps, snaps, clips, screw fasteners, and any other mechanical coupling means without departing from this invention.

Figure 3:
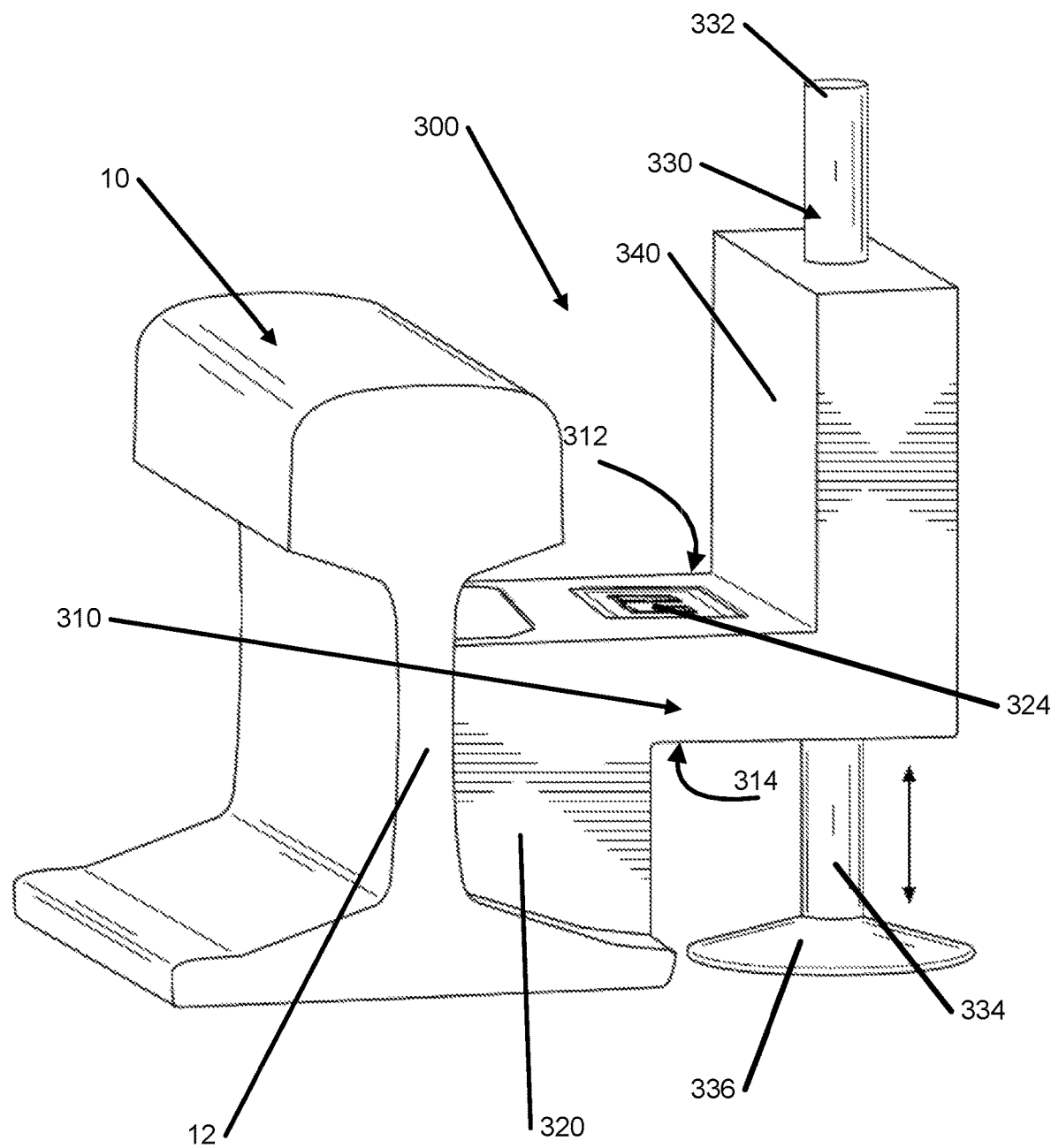
FIG. 3 is a perspective view of another embodiment of a vertical rail measurement device installed on a rail in accordance with an embodiment of the system of the present invention.

FIG. 3 illustrates a second embodiment of a vertical rail measurement device 300.

Specifically, FIG. 3 illustrates an side perspective view of a vertical rail measurement device 300 installed on a rail 10. For embodiment of FIG. 3, the features are referred to using similar reference numerals under the "3xx" series of reference numerals, rather than "1xx" as used in the embodiment of FIG. 1. Accordingly, certain features of the vertical rail measurement device 300 that were already described above with respect to the vertical rail measurement device 100 of FIG. 1 may be described in lesser detail, or may not be described at all. The vertical rail measurement device 300 may include a control box 310, and a measurement arm 330. As illustrated in FIG. 3, a sensor 340 may be part of the control box 310. The measurement arm 330 may slidably extend through the sensor 340 of the control box 310 vertically. The measurement arm 330 may be spring-loaded to slidably extend through the sensor 340 of the control box 310 in order to extend from the ground and measure the vertical displacement of a rail 10. Specifically as illustrated in FIG. 3, the vertical rail measurement device 300 may be installed on a web 12 of the rail 10 with the measurement arm 330 fixed to the track ballast on the ground.

As illustrated in FIG. 3, the measurement arm 330 includes a first end 332 and a second end 334 opposite the first end 332. The second end 334 may include a plate 336 attached to the end of the second end 334. The plate 336 may be circular in shape so that the plate 336 can be fixed to the ground or track ballast. The measurement arm 330 may be slidably attached or connected through the sensor 340 of the control box 310. The measurement arm 330 may be spring-loaded and slidably extend through the sensor 340 of the control box 310 while fixed to the ground or track ballast or stone to measure and record the maximum and minimum vertical distance rail movement while a train is operating over the rail 10 at all speeds.

As further illustrated in FIG. 3, the control box 310 may be a rectangular shape with a top panel 312 and a bottom panel 314 opposite the top panel 312. As illustrated in FIG. 3, the top panel 312 may include a display 324. The display 324 may be an LCD display or similar display known and used in the art. The display 324 may display various measurements, such as a real-time vertical rail displacement, and minimum and maximum vertical rail displacements. The display 324 may be customizable by software and/or programming to display other features and other information as recognized as pertinent to the operators. The control box 310 may also include one or more sensors 340. The one or more sensors 340 may sense and detect an approaching train and automatically turn on the vertical rail measurement device 300. The control box 310 may be powered by various batteries.

Generally, the vertical rail measurement device 300 and specifically, the control box 310 may attach or be mountable to one of the web 12 of the rail 10. The control box 310 may include a mounting portion 320. The mounting portion 320 may attach or be mountable to one of the web 12 of the rail 10 in various other mechanical means. For example, the mounting portion 320 of the control box 310 may attach or mount to the web 12 of the rail 10 via various magnets or magnetic arrays to magnetically attach the control box 310 and the vertical rail measurement device 300 to the web 12 of the rail 10. Additionally, the mounting portion 320 and the control box 310 may utilize other mechanical coupling means, such as straps, snaps, clips, screw fasteners, and any other mechanical coupling means without departing from this invention.

Figure 4:
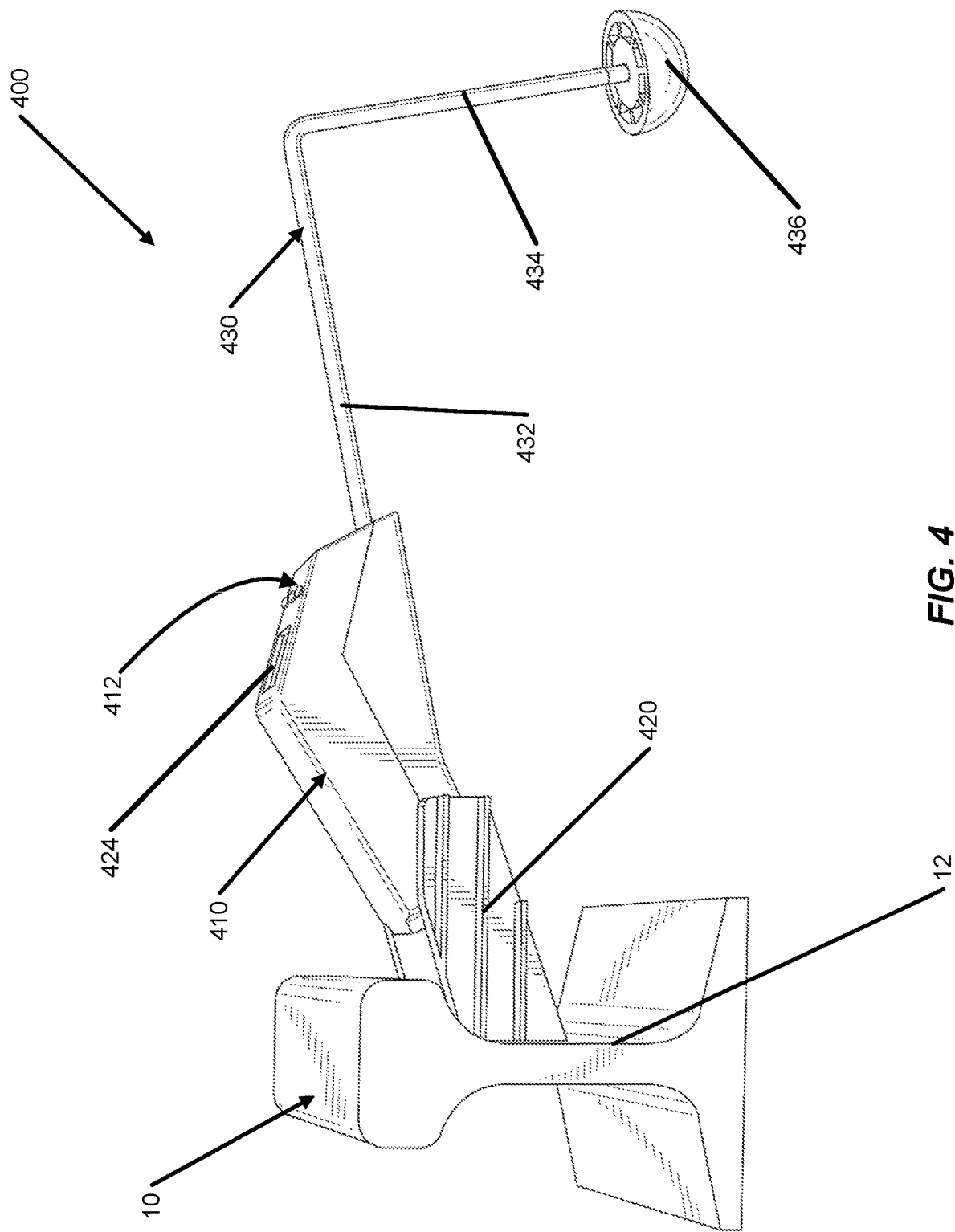
FIG. 4 is a perspective view of another vertical rail measurement device attached to a rail in accordance with an embodiment of the system of the present invention.
Figure 5:
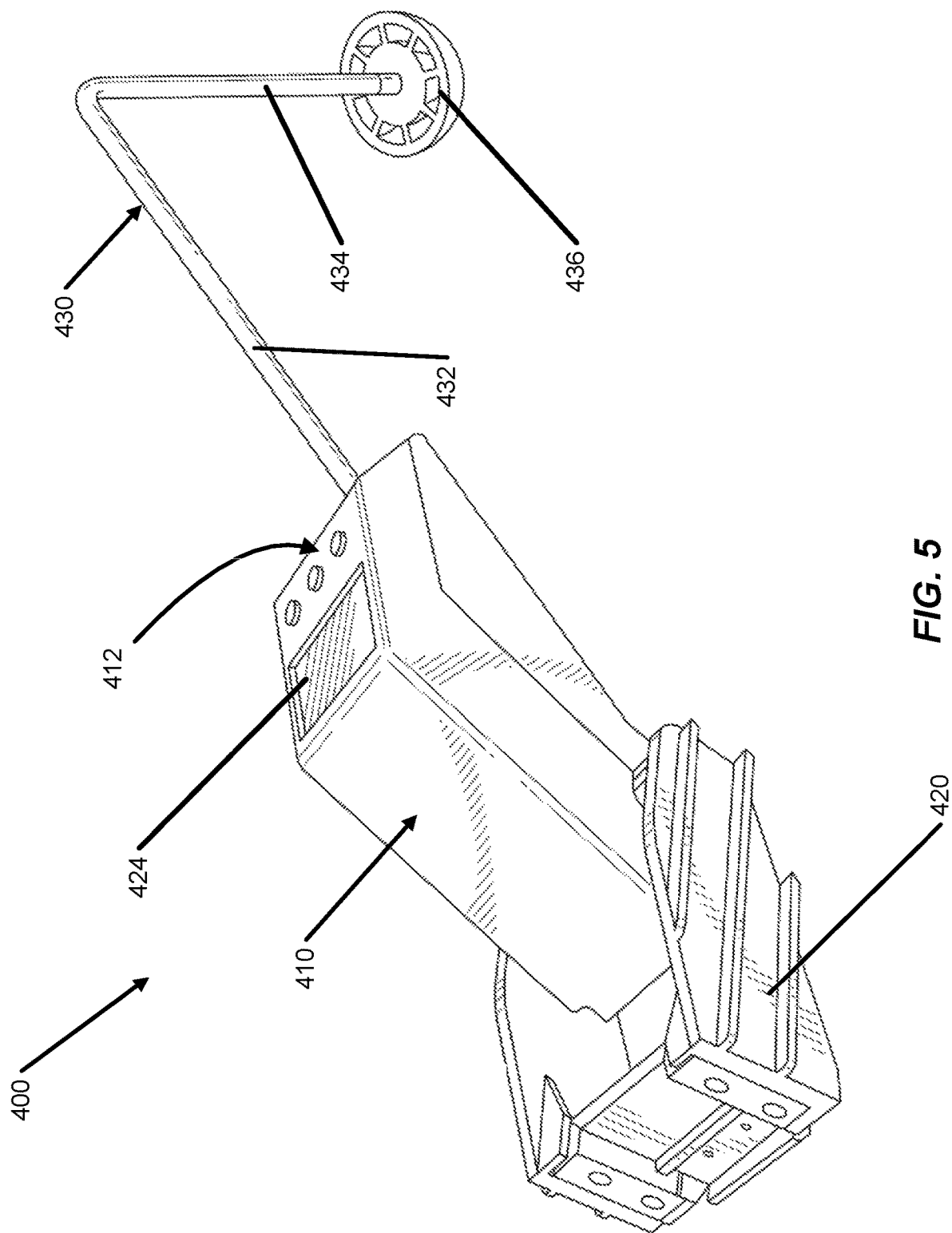
FIG. 5 is another perspective view of the vertical rail measurement device of FIG. 4 in accordance with an embodiment of the system of the present invention.
Figure 6:
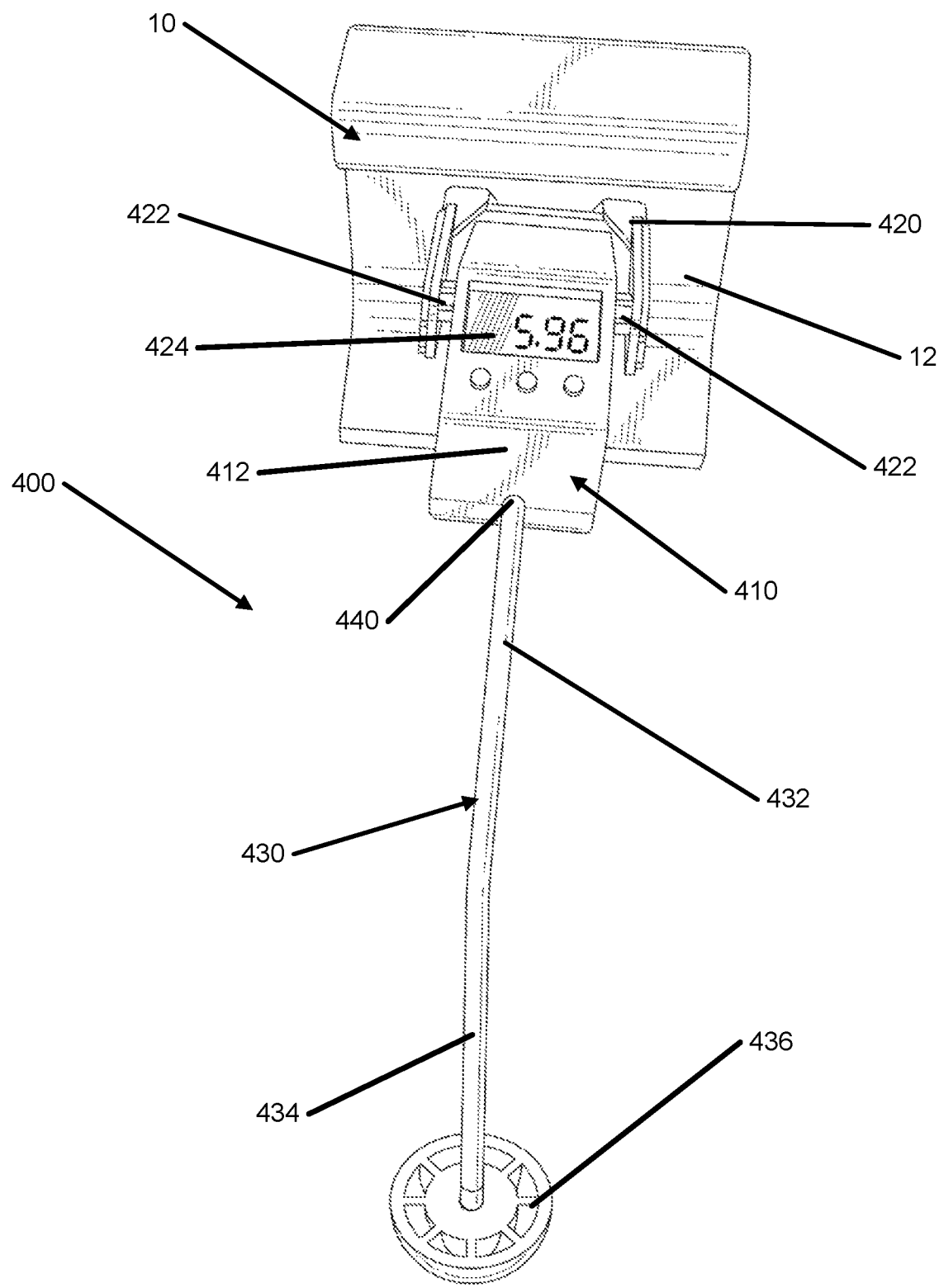
FIG. 6 is a front perspective view of the vertical rail measurement device of FIG. 4 in accordance with an embodiment of the system of the present invention.
Figure 7:
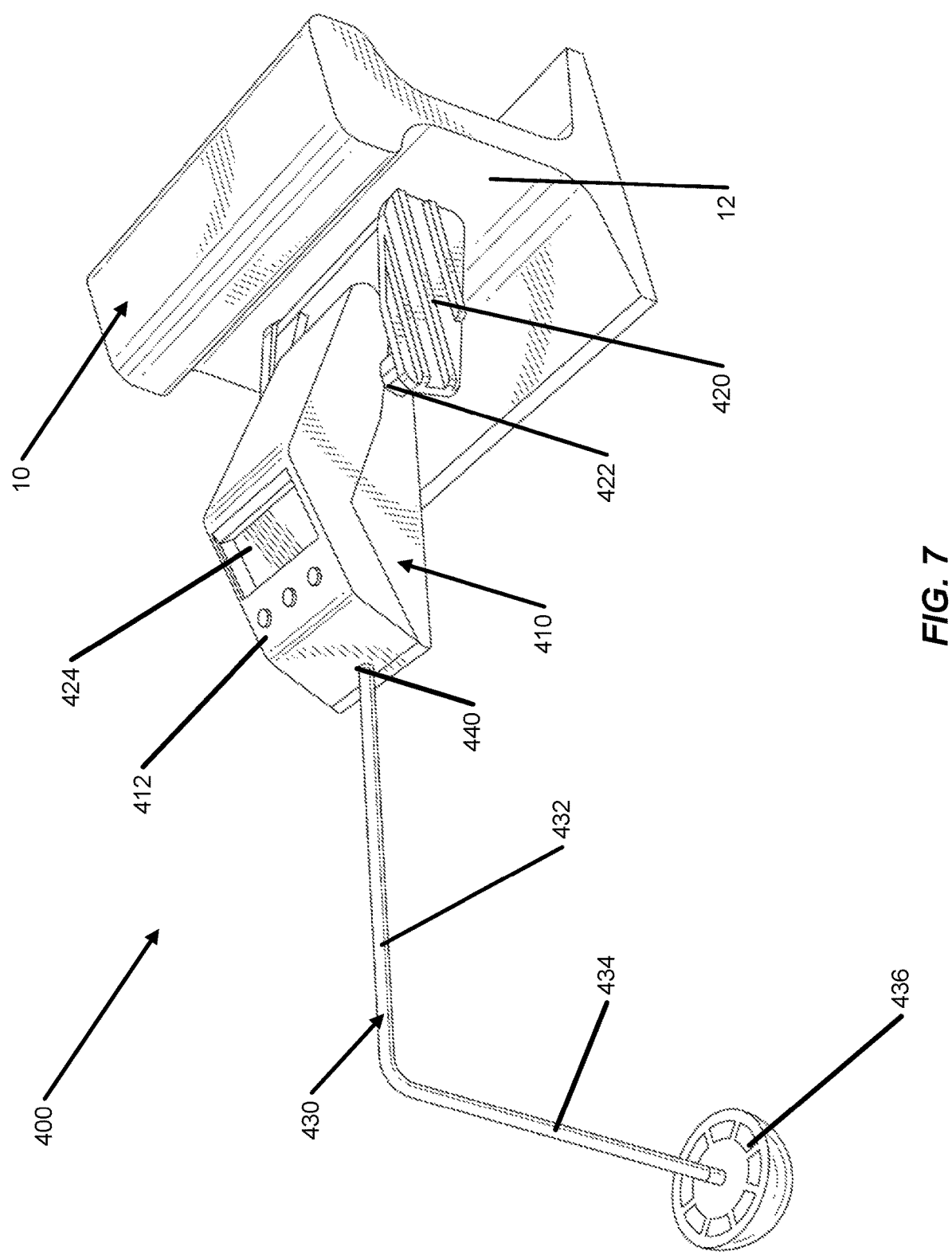
FIG. 7 is another perspective view of the vertical rail measurement device of FIG. 4 in accordance with an embodiment of the system of the present invention.

FIGS. 4-7 illustrate another embodiment of a vertical rail measurement device 400. Specifically, FIG. 4 illustrates an side perspective view of a vertical rail measurement device 400 installed on a rail 10. FIG. 5 illustrates a side perspective view of the vertical rail device 400 not installed on the rail 10. FIG. 6 illustrates a front perspective view of the vertical rail device 400 installed on the rail 10. FIG. 7 illustrates another side perspective view of the vertical rail device 400 installed on the rail 10. For the embodiment of FIGS. 4-7, the features are referred to using similar reference numerals under the "4xx" series of reference numerals, rather than "1xx" as used in the embodiment of FIG. 1 or "3xx" as used in the embodiment of FIG. 3. Accordingly, certain features of the vertical rail measurement device 400 that were already described above with respect to the vertical rail measurement device 100, 300 of FIGS. 1 and 3 may be described in lesser detail, or may not be described at all. The vertical rail measurement device 400 may include a control box 410, a measurement arm 430, and a mounting portion 420. As illustrated in FIGS. 6 and 7, a sensor 440 may be part of the control box 410. The control box 410 may be tiltably attached to the mounting portion 420 at one or more pivot points 422. The measurement arm 430 may extend through the control box 410 and the sensor 440 of the control box 410 vertically. The measurement arm 430 may include a pivoting tilt sensor 440 that extends through the control box 410 in order to extend to the ground or ballast and measure the vertical displacement of the rail 10. Specifically as illustrated in FIGS. 4, 6, and 7, the vertical rail measurement device 400, and more specifically, the mounting base 450 may be installed on a web 12 of the rail 10 with the measurement arm 430 and a ball 436 resting on the track ballast on the ground.

As illustrated in FIGS. 4-7, the measurement arm 430 includes a first portion 432 and a second portion 434. The first portion 432 may extend from the control box 410 and the vertical tilt sensor 440. The second portion 434 may extend perpendicularly from the first portion 432 towards the direction of the ground. The second portion 434 may include a ball 436 located opposite the first portion and at an end of the second portion 434. The ball 436 that may rest on the track ballast or the ground such that the vertical tilt sensor 440 measures the minimum and maximum vertical rail displacement. The measurement arm 430 may be pivotally attached or connected through the sensor 440 of the control box 410.

As illustrated in FIGS. 4-7, the control box 410 may be include a top panel 412. As illustrated in FIGS. 4-7, the top panel 412 may include a display 424. The display 424 may be an LCD display or similar display known and used in the art. The display 424 may display various measurements, such as a real-time vertical rail displacement, and minimum and maximum vertical rail displacements. The display 424 may be customizable by software and/or programming to display other features and other information as recognized as pertinent to the operators. The control box 410 may also include one or more additional sensors. The one or more sensors may sense and detect an approaching train and automatically turn on the vertical rail measurement device 400 when the train is travelling on the rails and over the vertical rail measurement device 400 and the control box 410. The control box 410 may be powered by various batteries.

Generally, the vertical rail measurement device 400 and specifically, the control box 410 and the mounting portion 420 may attach or be mountable to one of the web 12 of the rail 10. The control box 410 may be tiltably attached to the mounting portion 420 at one or more pivot points 422. As specifically illustrated in FIG. 6, the pivots points 422 may be located on either side of the mounting portion 420 and the control box 410. The mounting portion 320 may attach or be mountable to one of the web 12 of the rail 10 in various other mechanical means. For example, the mounting portion 420 of the control box 410 may attach or mount to the web 12 of the rail 10 via various magnets or magnetic arrays to magnetically attach the mounting porting 420, the control box 410, and the vertical rail measurement device 400 to the web 12 of the rail 10. Additionally, the mounting portion 420 and the control box 410 may utilize other mechanical coupling means, such as straps, snaps, clips, screw fasteners, and any other mechanical coupling means without departing from this invention.

For all of the vertical rail measurement devices 100, 300, 400 and specifically, the control box 110, 310, 410 may include a remote communication method, such as Bluetooth, a radar, a 900 MHz radio, and a microprocessor. The radio may be 900 MHz or other frequencies without departing from this invention. The radio may include an antenna on vertical rail measurement device 100, 300, 400 to transmit the information. The purpose of the radio is to transmit data from the vertical rail measurement device 100, 300, 400 to any remote locations as required. Additionally, the Bluetooth may provide communication from the vertical rail measurement device 100, 300, 400 to a smart device.

The vertical rail measurement device 100, 300, 400 and specifically, the control box 110, 310, 410 may also include a microprocessor as well as data storage capabilities, such as USB and other forms of similar data storage capabilities. The microprocessor may be programmed to include data logging features as well and to record and log any and all data from the vertical rail measurement device 100, 300, 400. The data logged may then be uploaded to be analyzed and reviewed as needed and required.

An embodiment for transmitting and receiving the data collected by the vertical rail measurement device 100, 300, 400 described above is provided in FIG. 8. It should be noted that the term "remote" as used herein means any location that is not at the vertical rail measurement device 100, 300, 400. Such a location may be next to the vertical rail measurement device 100, 300, 400, such as in a rail yard, or a location that is cross country with respect to the location of the vertical rail measurement device 100, 300, 400.

Figure 8:
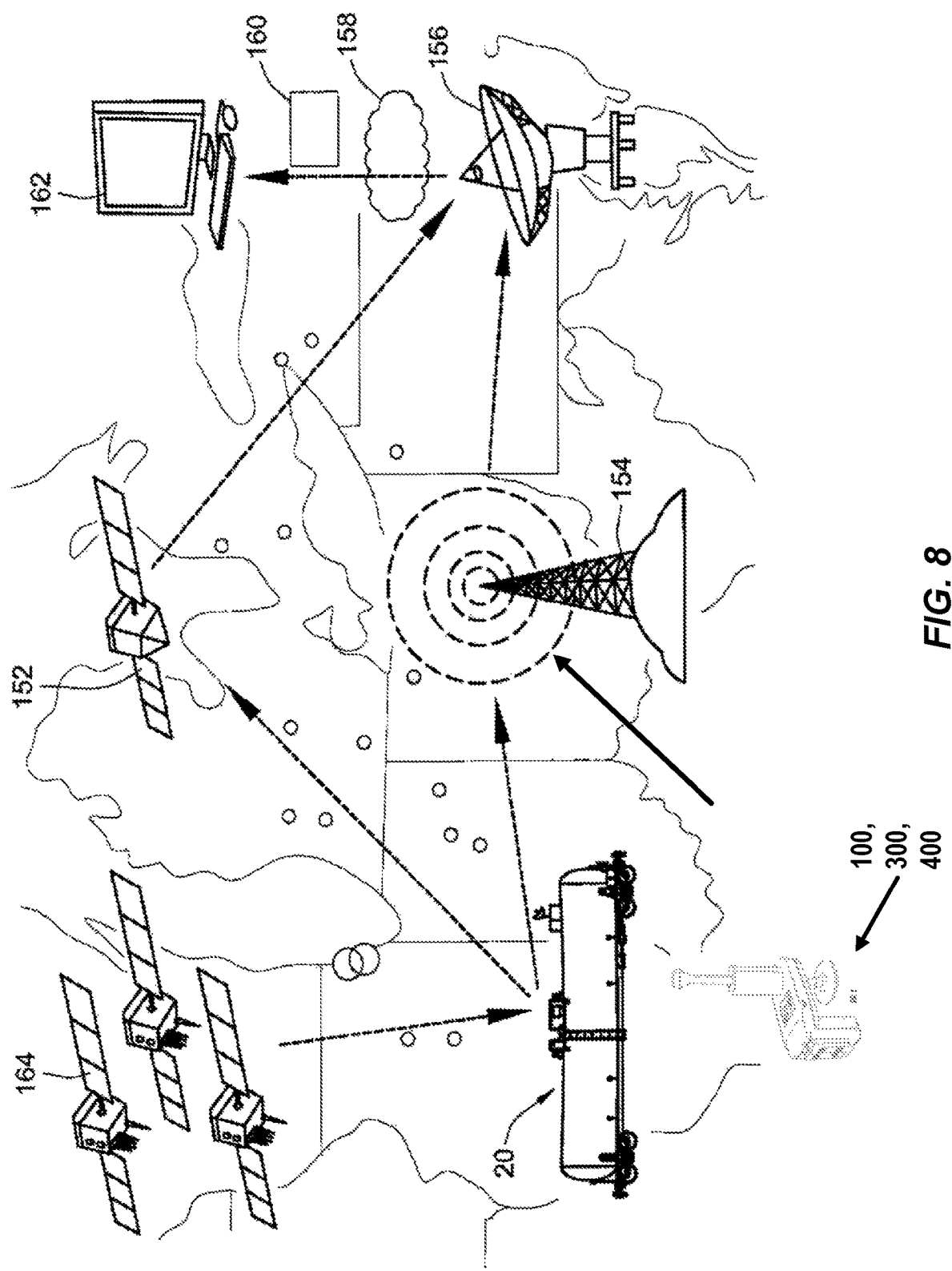
FIG. 8 is a flow diagram illustrating the data transmission and reception components in accordance with an embodiment of the vertical rail measurement device of the present invention.

As illustrated in FIG. 8, the data from the vertical rail measurement device 100, 300, 400 may be transmitted to a geo-stationary communications satellite 152 and/or a cellular system 154 to one or more remote receiving station(s) 156. The receiving station 156 transmits the data via the Internet 158 to a web based portal 160 which is accessible by a user via a workstation 162. Data collected and transmitted can be from any vertical rail measurement device 100, 300, 400. Location data may be generated by Global Positioning System (GPS) satellite technology 164. As was described above, the vertical rail measurement device 100, 300, 400 may feature a number of additional data collection outputs, such as real-time vertical rail displacement, minimum and maximum vertical rail displacement, speed of the train, and direction of the train. Outputs from all of the data from the vertical rail measurement device 100, 300, 400 may be combined together to electronically represent the status or condition.

In an embodiment of the system, wireless sensors located at various locations throughout a rail yard may be set up in a wireless network with each sensor (node) having its own power source and transceiver. The nodes can communicate with other nodes and determine the best path of communication and minimize power requirements throughout the rail yard.

The vertical rail measurement device 100, 300, 400 may include a receiver/CPU and a GPS transponder which interacts with the U.S. Federal location satellites. This feature gives location, altitude, speed and other features offered by conventional GPS capabilities. The GPS and sensor data is then transmitted via a modem in the specified form of transmission along with the remaining rail displacement data. Once the data is received by the end user, the data can be further combined for additional value. A preferred method to add value to data generated by the system is by associating the location data (GPS) with information stored in the on-board memory of microprocessors in the vertical rail measurement device 100, 300, 400.

Once data is received by the end user (such as receiving station 156 or portal 160 in FIG. 8), it is loaded into a website or computer based software program capable of sorting, running calculations, manipulating and displaying data in formats that benefit the end user. The software may include a website which can display and run calculations to provide the needed information for the end user.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

We claim:

1. A vertical rail measurement device to measure a vertical displacement distance for the movement of a rail when a train is passing over the device, the device comprising: a control box configured to mount to a web of a rail; and a measurement arm that includes a ball that pivots and extends through a tilt sensor within the control box with the ball resting on one of the ground or a track ballast, wherein the measurement arm measures a real-time vertical rail displacement, a maximum vertical rail displacement, and a minimum vertical rail displacement while a train is operating at all speeds, wherein the measurement arm pivots with the tilt sensor within the control box and the measurement arm pivots with the ball extending and resting on the ground or track ballast to measure the real-time vertical rail displacement, a maximum vertical rail displacement, and a minimum vertical rail displacement.

2. The device of claim 1, wherein the control box includes one or more sensors that automatically detect an approaching train and automatically turn on the vertical rail measurement device when an approaching train is in range.

3. The device of claim 1, wherein the control box measures and records the maximum vertical rail displacement to ensure the maximum vertical rail displacement does not exceed a vertical rail displacement that could derail the train.

4. The device of claim 1, wherein the vertical rail measurement device weighs less than 3 pounds.

5. The device of claim 1, wherein the control box includes a display that displays one or more of the following: the real-time vertical rail displacement, the maximum vertical rail displacement, or the minimum vertical rail displacement.

6. The device of claim 5, wherein the display is customizable by programming to display other features and information.

7. The device of claim 5, wherein the display is an LCD display.

8. The device of claim 1, wherein the control box includes a microprocessor that includes data storage that can be programmed to record and log any data from the vertical rail measurement device.

9. The device of claim 8, wherein the data from the vertical rail measurement device is transmitted from the control box to a smart device via Bluetooth.

10. The device of claim 1, wherein the control box includes a magnetic mount on a mounting portion of the control box, wherein the magnetic mount attaches to the web of the rail.

11. The device of claim 1, wherein the measurement arm includes a first portion that extends from the control box and a second portion that extends perpendicularly from the first portion towards the ground or track ballast, the second portion including the ball that rests on the ground or track ballast when the measurement arm pivots from the control box.

12. A vertical rail measurement device to measure a vertical displacement distance for the movement of a rail when a train is passing over the device, the device comprising:
a control box configured to mount to a web of a rail and includes a microprocessor that includes data storage that can be programmed to record and log any data from the vertical rail measurement device, and a display that displays one or more of the following data: a real-time vertical rail displacement, a maximum vertical rail displacement, or a minimum vertical rail displacement; and
a measurement arm that pivots and extends from a tilt sensor through the control box and rests on one of the ground or a track ballast, wherein the measurement arm pivots to measure the real-time vertical rail displacement, the maximum vertical rail displacement, and the minimum vertical rail displacement while a train is operating at all speeds, wherein the measurement arm includes a ball that attaches to a pivoting point on the control box with the tilt sensor within the control box and extends and rests on the ground or the track ballast.

13. The device of claim 12, wherein the control box includes one or more sensors that automatically detect an approaching train and automatically turn on the vertical rail measurement device when an approaching train is in range.

14. The device of claim 12, wherein the vertical rail measurement device weighs less than 3 pounds.

15. The device of claim 12, wherein the display is customizable by programming to display other features and information.

16. The device of claim 15, wherein the display is an LCD display.

17. The device of claim 12, wherein the data from the vertical rail measurement device is transmitted from the control box to a smart device via Bluetooth.

18. The device of claim 12, wherein the control box includes a magnetic mount on a mounting portion of the control box, wherein the magnetic mount attaches to the web of the rail.

19. The device of claim 12, wherein the measurement arm includes a first portion that extends from the control box and a second portion that extends perpendicularly from the first portion towards the ground or track ballast, the second portion including the ball that rests on the ground or track ballast when the measurement arm pivots from the control box.

20. A vertical rail measurement device to measure a vertical displacement distance for the movement of a rail when a train is passing over the device, the device comprising:
a control box configured to mount to a web of a rail and includes a mounting portion with a magnetic mount that attaches to the web of the rail, the control box comprises:
a microprocessor that includes data storage that can be programmed to record and log any data from the vertical rail measurement device,
an LCD display that displays the following data: a real-time vertical rail displacement, a maximum vertical rail displacement, and a minimum vertical rail displacement, and
one or more sensors that automatically detect an approaching train and automatically turn on the vertical rail measurement device when an approaching train is in range; and
a measurement arm that pivots and extends through a vertical sensor and the control box to one of the ground or a track ballast, wherein the measurement arm measures the real-time vertical rail displacement, the maximum vertical rail displacement, and the minimum vertical rail displacement while a train is operating at all speeds, wherein the measurement arm includes a first portion that extends from the control box and a second portion that extends perpendicularly from the first portion towards the ground or track ballast, the second portion including a ball that rests on the ground or track ballast when the measurement arm pivots from the control box.

21. The device of claim 20, wherein the vertical rail measurement device weighs less than 3 pounds.

22. The device of claim 20, wherein the display is customizable by programming to display other features and information.

23. The device of claim 20, wherein the data from the vertical rail measurement device is transmitted from the control box to a smart device via Bluetooth.

24. The device of claim 20, wherein the control box is pivotally connected to the mounting portion.

25. A vertical rail measurement device to measure a vertical displacement distance for the movement of a rail when a train is passing over the device, the device comprising:
   a control box configured to mount to a web of a rail and includes a mounting portion with one or more magnets to magnetically attach the control box to the web of the rail, the control box pivotally connected to the mounting portion, the control box comprises:
      a microprocessor that includes data storage that can be programmed to record and log any data from the vertical rail measurement device, and
      a display that displays one or more of the following data: a real-time vertical rail displacement, a maximum vertical rail displacement, or a minimum vertical rail displacement; and
   a measurement arm that pivots and extends through a vertical sensor located on the control box to one of the ground or a track ballast, wherein the measurement arm measures the real-time vertical rail displacement, the maximum vertical rail displacement, and the minimum vertical rail displacement while a train is operating at all speeds, wherein the measurement arm includes a first portion that extends from the control box and a second portion that extends perpendicularly from the first portion towards the ground or track ballast, the second portion including a ball that rests on the ground or track ballast when the measurement arm pivots from the control box.

26. The device of claim 25, wherein the vertical rail measurement device weighs less than 3 pounds.

27. The device of claim 25, wherein the display is customizable by programming to display other features and information.

28. The device of claim 25, wherein the display is an LCD display.

29. The device of claim 25, wherein the data from the vertical rail measurement device is transmitted from the control box to a smart device via Bluetooth.

30. The device of claim 25, wherein the control box includes one or more sensors that automatically detect an approaching train and automatically turn on the vertical rail measurement device when an approaching train is in range.

* * * * *